US010826126B2

(12) United States Patent
Golodnitsky et al.

(10) Patent No.: US 10,826,126 B2
(45) Date of Patent: Nov. 3, 2020

(54) 3D MICRO-BATTERY ON 3D-PRINTED SUBSTRATE

(71) Applicant: Ramot at Tel-Aviv University Ltd., Tel Aviv (IL)

(72) Inventors: Diana Golodnitsky, Rishon Lezion (IL); Gabor Kosa, Modiin (IL); Yosef Kamir, Netanya (IL); Raymond Blanga, Binyamina (IL); Eran Rosen, Ganei-Tikva (IL); Elazar Cohen, Binyamina (IL)

(73) Assignee: RAMOT AT TEL-AVIV UNIVERSITY LTD., Tel Aviv (IL)

( * ) Notice: Subject to any disclaimer, the term of this patent is extended or adjusted under 35 U.S.C. 154(b) by 226 days.

(21) Appl. No.: 15/924,217

(22) Filed: Mar. 18, 2018

(65) Prior Publication Data

US 2018/0205113 A1  Jul. 19, 2018

Related U.S. Application Data

(63) Continuation-in-part of application No. PCT/IB2016/055735, filed on Sep. 26, 2016.
(Continued)

(51) Int. Cl.
*H01M 10/058* (2010.01)
*H01M 10/04* (2006.01)
(Continued)

(52) U.S. Cl.
CPC ......... *H01M 10/058* (2013.01); *B29C 64/118* (2017.08); *B33Y 10/00* (2014.12);
(Continued)

(58) Field of Classification Search
CPC ..... B29C 64/106; B29C 64/118; B33Y 10/00; B33Y 70/00; B33Y 80/00; H01G 11/08;
(Continued)

(56) References Cited

U.S. PATENT DOCUMENTS 4,173,745 A  11/1979 Saunders
4,346,153 A   8/1982 Rigal et al.
(Continued)

FOREIGN PATENT DOCUMENTS

EP  0331342 A2   9/1989
EP  0450848 A3  10/1991
(Continued)

OTHER PUBLICATIONS

Yufit et al., "Thin-film lithium and lithium-ion batteries with electrochemically deposited molybdenum oxysulfide cathodes", Journal of Power Sources 122, pp. 169-173, 2003.
(Continued)

*Primary Examiner* — Lingwen R Zeng
(74) *Attorney, Agent, or Firm* — Kligler & Associates Patent Attorneys Ltd

(57) ABSTRACT

An electrical energy storage device (20) includes a substrate (22), an anode layer (30), a cathode layer (26), and a separator layer (28) between the anode layer and the cathode layer. The substrate has multiple sets of intersecting cavities (21) passing through the substrate in different directions. The anode layer, cathode layer, and separator layer are formed over a surface of the substrate within the cavities.

25 Claims, 5 Drawing Sheets

Related U.S. Application Data

(60) Provisional application No. 62/234,689, filed on Sep. 30, 2015.

(51) Int. Cl.

| | | |
|---|---|---|
| *B33Y 80/00* | (2015.01) | |
| *B33Y 70/00* | (2020.01) | |
| *B33Y 10/00* | (2015.01) | |
| *H01M 10/38* | (2006.01) | |
| *H01G 11/52* | (2013.01) | |
| *H01G 11/26* | (2013.01) | |
| *H01G 11/08* | (2013.01) | |
| *H01G 11/10* | (2013.01) | |
| *H01G 11/28* | (2013.01) | |
| *B29C 64/118* | (2017.01) | |
| *H01M 10/0525* | (2010.01) | |

(52) U.S. Cl.
CPC .............. *B33Y 70/00* (2014.12); *B33Y 80/00* (2014.12); *H01G 11/08* (2013.01); *H01G 11/10* (2013.01); *H01G 11/26* (2013.01); *H01G 11/28* (2013.01); *H01G 11/52* (2013.01); *H01M 10/04* (2013.01); *H01M 10/38* (2013.01); *H01M 10/0525* (2013.01); *Y02E 60/13* (2013.01)

(58) Field of Classification Search
CPC ........ H01G 11/10; H01G 11/26; H01G 11/28; H01G 11/52; H01M 10/04; H01M 10/0525; H01M 10/058; H01M 10/38; Y02E 60/13
See application file for complete search history.

(56) References Cited

U.S. PATENT DOCUMENTS

| | | |
|---|---|---|
| 4,416,915 A | 11/1983 | Palmer et al. |
| 4,659,637 A | 4/1987 | Nelson et al. |
| 4,822,701 A | 4/1989 | Ballard et al. |
| 4,878,094 A | 10/1989 | Balkanski |
| 4,906,536 A | 3/1990 | Simonton |
| 5,019,468 A | 5/1991 | Miyabayashi |
| 5,041,199 A | 8/1991 | Di Franco |
| 5,162,178 A | 11/1992 | Ohsawa et al. |
| 5,187,564 A | 2/1993 | McCain |
| 5,268,243 A | 12/1993 | Noda et al. |
| 5,338,625 A | 8/1994 | Bates et al. |
| 5,421,083 A | 6/1995 | Suppelsa et al. |
| 5,498,312 A | 3/1996 | Laermer et al. |
| 5,508,542 A | 4/1996 | Geiss et al. |
| 5,545,308 A | 8/1996 | Murphy et al. |
| 5,567,210 A | 10/1996 | Bates et al. |
| 5,654,114 A | 8/1997 | Kubota et al. |
| 5,672,446 A | 9/1997 | Barker et al. |
| 5,916,514 A | 6/1999 | Eshraghi |
| 6,025,094 A | 2/2000 | Visco et al. |
| 6,025,225 A | 2/2000 | Forbes et al. |
| 6,197,450 B1 | 3/2001 | Nathan et al. |
| 6,214,161 B1 | 4/2001 | Becker et al. |
| 6,260,388 B1 | 7/2001 | Borrelli et al. |
| 6,264,709 B1 | 7/2001 | Yoon et al. |
| 6,270,714 B1 | 8/2001 | Azran et al. |
| 6,300,709 B1 | 10/2001 | DeVoe et al. |
| 6,303,512 B1 | 10/2001 | Laermer et al. |
| 6,316,142 B1 | 11/2001 | Delnick et al. |
| 6,610,440 B1 | 8/2003 | LaFollette et al. |
| 6,720,273 B1 | 4/2004 | Becker et al. |
| 7,204,862 B1 | 4/2007 | Zhang |
| 7,618,748 B2 | 11/2009 | Nathan |
| RE41,578 E | 8/2010 | Nathan et al. |
| RE42,073 E | 1/2011 | Nathan et al. |
| RE42,273 E | 4/2011 | Nathan et al. |
| 9,123,954 B2 | 9/2015 | Nathan |
| 2002/0132167 A1 | 9/2002 | Gan et al. |
| 2003/0077515 A1 | 4/2003 | Chen et al. |
| 2003/0170533 A1 | 9/2003 | Airey et al. |
| 2004/0055420 A1 | 3/2004 | Garbar et al. |
| 2006/0032046 A1* | 2/2006 | Nathan .................... C25D 9/04 29/623.5 |
| 2008/0176139 A1 | 7/2008 | White et al. |
| 2009/0142656 A1 | 6/2009 | Nathan et al. |
| 2009/0170001 A1 | 7/2009 | Roozeboom et al. |
| 2010/0151318 A1 | 6/2010 | Lopatn et al. |
| 2011/0045351 A1 | 2/2011 | Peled et al. |
| 2011/0171518 A1 | 7/2011 | Dunn et al. |
| 2013/0189602 A1* | 7/2013 | Lahiri .................... H01M 4/80 429/452 |
| 2017/0346129 A1* | 11/2017 | Stolyarov .............. H01G 11/32 |

FOREIGN PATENT DOCUMENTS

| | | |
|---|---|---|
| EP | 1134821 A1 | 9/2001 |
| FR | 2550015 A1 | 2/1985 |
| FR | 2606207 A1 | 5/1988 |
| FR | 2621174 A1 | 3/1989 |
| GB | 2161988 A1 | 1/1986 |
| JP | 2168560 A | 6/1990 |
| NL | 1015956 C2 | 2/2002 |
| WO | 2005027245 A | 3/2005 |
| WO | 2005036711 A2 | 4/2005 |
| WO | 2005101973 A2 | 11/2005 |
| WO | 2006056964 A2 | 6/2006 |
| WO | 2011053736 A1 | 5/2011 |
| WO | 2013019983 A1 | 2/2013 |
| WO | 2014182535 A1 | 11/2014 |

OTHER PUBLICATIONS

Gao et al., "Fabrication and Electron Field Emission Properties of Carbon Nanotube Films by Electrophoretic Deposition", Advanced Materials, vol. 13, No. 23, pp. 1770-1773, Dec. 3, 2001.

Howard et al., "Theoretical Evaluation of High-Energy Lithium Metal Phosphate Cathode Materials in Li-ion Batteries", Journal of Power Sources, vol. 165, pp. 887-891, year 2007.

Dupin et al., "Amorphous Oxysulfide Thin Films MOySz (M=W, Mo, Ti) XPS Characterization: Structural and Electronic Peculiarities", Applied Surface Science, vol. 173, pp. 140-150, year 2001.

Wang et al., "Developments in Nanostructured Cathode Materials for High-Performance Lithium-Ion Batteries", Advanced Materials, vol. 20, issue 12, pp. 2251-2269, Jun. 18, 2008.

Roy et al., "Hydrothermal Growth of CuS Nanowires from Cu-Dithiooxamide, a Novel Single Source Precursor", Crystal Growth & Design, vol. 6, No. 8, pp. 1921-1926, year 2006.

Devadasan et al., "Electrodeposition of P-ws2 Thin-Film and Characterisation", Journal of Crystal Growth, vol. 226, issue 1, pp. 67-72, Jun. 2001.

Miki et al., "Amorphous MoS2 as the cathode of lithium secondary batteries", Journal of Power Sources, vol. 54, issue 2, pp. 508-510, Apr. 1995.

Ponomarev et al., "Electrochemical deposition of MoS2 thin films by reduction of tetrathiomolybdate", vol. 280, Issues 1-2, pp. 86-89, Jul. 1996.

Long et al., "Three-Dimensional Battery Architectures", Chemical Review, vol. 10, No. 104, pp. 4463-4492, Oct. 2004.

Hart et al., "3-D Microbatteries", Electrochemistry Communications, vol. 5, pp. 120-123, year 2003.

Kleimann et al., "Formation of Wide and Deep Pores in Silicon by Electrochemical Etching", Materials Science and Engineering B, vols. 69-700, pp. 29-33, year 2000.

Li et al., "Microfabrication of Thermoelectric Materials by Silicon Molding Process", Sensors and Actuators A, vol. 108, pp. 97-102, year 2003.

Kim et al., "Three-Dimensional Porous Silicon Particles for Use in High-Performance Lithium Secondary Batteries", Angewandte Chemie, vol. 47, issue 52, pp. 10151-10154, year 2008.

Golodnitsky et al., "Progress in Three-Dimensional (3D) Li-ion Microbatteries", Solid State Ionics, vol. 177, pp. 2811-2819, year 2006.

(56) References Cited

OTHER PUBLICATIONS

Steingart et al., "Micropower Materials Development for Wireless Sensor Networks", MRS Bulletin, vol. 33, No. 3, pp. 408-409, Apr. 2008.
Patil et al., "Issue and challenges facing rechargeable thin film lithium batteries", Materials Research Bulletin, vol. 43, Issues 8-9, pp. 1913-1942, Aug. 4-Sep. 4, 2008.
Sailor et al., "Smart Dust: Nanostructured Devices in a Grain of Sand", Chemical Communications, pp. 1375-1383, year 2005.
Kim et al., "Micro-Capsule Endoscope for Gastro Intestinal Tract", Proceedings of the 29th Conference of IEEE Engineering in Medicine and Biology Society, Lyon, France, Aug. 23-26, 2007.
Golodnitsky et al., "Advanced materials for the 3D microbattery", Journal of Power Sources, vol. 153, pp. 281-287, year 2006.
Nathan et al., "Three-dimensional thin-film Li-ion microbatteries for autonomous MEMS", Journal of Microelectromechanical Systems, vol. 14, issue 5, pp. 879-885, Oct. 2005.
Bonino et al., "Electrochemical Behavior of Solid Cathode Materials in Organic Electrolyte Lithium Batteries: Copper Sulfides", Journal of the Electrochemical Society, vol. 131, Issue 7, pp. 1498-1502, Jul. 1984.
Miller et al., "Semiconductor liquid junction solar cells based on anodic sulphide films", Nature, vol. 262, pp. 680-681, Aug. 19, 1976.
Peter, L.M., "The electrocrystallisation of cadmium sulphide films of cadmium", Electrochimica Acta, vol. 23, Issue 3, pp. 165-174, Mar. 1978.
Engelken et al., "Electrodeposition and Material Characterization of CuxS Films", Journal of the Electrochemical Society, vol. 132, issue 3, pp. 567-573, Mar. 1985.
Panicker et al., "Cathodic Deposition of CdTe from Aqueous Electrolytes", Journal of the Electrochemical Society, vol. 125, issue 4, pp. 566-572, Apr. 1978.
Chung et al., "Electrochemical behaviors of CuS as a cathode material for lithium secondary batteries", Journal of Power Sources, vol. 108, issues 1-2, pp. 226-231, Jun. 2002.
Cheah et al., "Self-Supported Three-Dimensional Nanoelectrodes for Microbattery Applications", NANO Letters, vol. 9, issue 9, p. 3230, Jul. 2, 2009.
Ancutiene et al., "Formation and characterization of conductive thin layers of copper sulfide (CuxS) on the surface of polyethylene and polyamide by the use of higher polythionic acids", Applied Surface Science Journal, vol. 252, Issue 12, pp. 4218-4225, Apr. 16, 2006.
He et al., "Hall effect and surface characterization of Cu2S and CuS films deposited by RF reactive sputtering", Journal Physica B: Condensed Matter, vols. 308-310, pp. 1069-1073, Dec. 2001.
Nadel, D.J., "Microsensor clusters", Microelectronic Journal, vol. 33, issue 1-2, pp. 107-119, Jan. 2002.

Lehmann et al., "A Novel Capacitor Technology Based on Porous Silicon", Thin Solid Films Journal, vol. 276, Issue 1-2, pp. 138-142, Apr. 15, 1996.
Owen, "Ionically Conducting Glasses", Solid State Batteries, Sequiera and Hooper, Nato Science Series E, Springer, Oct. 1985.
De Tacconi et al., "Study of Copper Sulfide Film Formation by Voltammetry Combined with Electrochemical Quartz Crystal Microgravimetry/Coulometry and Optical Spectroscopy", The Journal of Physical Chemistry, vol. 100, issue 46, pp. 18234-18239, Nov. 14, 1996.
Martin-Litas et al., "Promising thin films (WO1.05S2 and WO1.35S2.2) as positive electrode materials in microbatteries", Journal of Power Sources, vols. 97-98, pp. 545-547, Jul. 2001.
Jones et al., "A Thin Film Sold State Microbattery", Solid State Ionics, vols. 53-56, Part 1 pp. 628-634, Jul.-Aug. 1992.
Albu-Yaron et al., "Influence of the Electromechanical Deposition Parameters on the Microstructure of MoS2 Thin Films", Thin Solid Films, vols. 361-362, No. 1, pp. 223-228, Feb. 2000.
Fragnaud et al., "Thin-Film Cathodes for Secondary Lithium Batteries", Journal of Power Sources, vol. 54, pp. 362-366, Apr. 1995.
Celgard LLC, "Product Celgard® 2400", May 2009.
Physical Electronics Inc., "XPS System—PHI 5600-CI", Feb 20, 2007 (http://www.ifw-dresden.de/institutes/ikm/organisation/dep-31/equipment).
Jeol Ltd., "JEOL JSM-6300 Scanning Electron Microscope", User Guide, Aug. 3, 2004.
Patent Abstracts of Japan, Publication No. 09-186461, Jul. 15, 1997.
Princeton Applied Research, "263A potentiostat/galvanostat", Aug. 1, 2008.
International Application # PCT/IB2016/055735 search report dated Jan. 2, 2017.
Ferrari et al., "Latest advances in the manufacturing of 3D rechargeable lithium microbatteries", Journal of Power Sources, Issue 286, pp. 25-46, 2015.
Mazor et al., "Electrophoretic deposition of lithium iron phosphate cathode for thin-film 3D-microbatteries", Journal of Power Sources, issue 198, pp. 264-272, 2012.
Torwell Technologies Co., Product TW-CON175BK, 2 pages, 2008-2010.
Ruzmetov et al., "Electrolyte Stability Determines Scaling Limits for Solid-State 3D Li Ion Batteries", Nano Letters, vol. 12, issue 1. pp. 505-511, year 2012.
Ergang et al., "Fabrication of a Fully Infiltrated Three-Dimensional Solid-State Interpenetrating Electrochemical Cell", Journal of the Electrochemical Society, vol. 154, issue 12, pp. A1135-A1139, 2007.
Notten et al., "3-D Integrated All-Solid-State Rechargeable Batteries", Advanced Materials, vol. 19, issue 24, pp. 4564-4567, Dec. 2007.

* cited by examiner

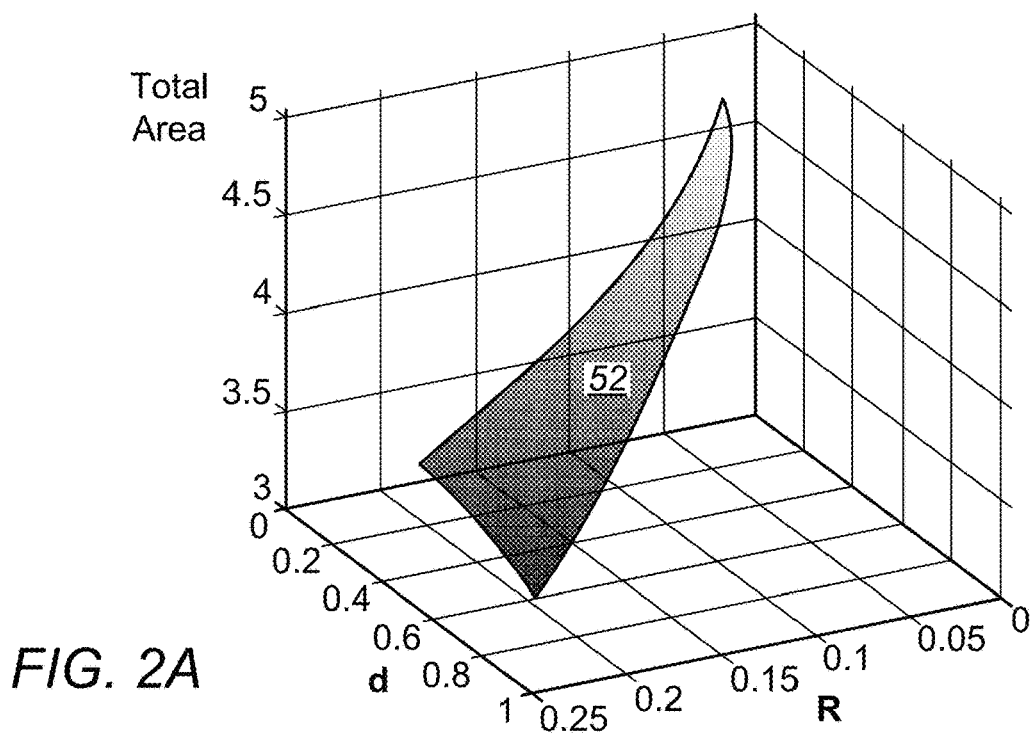
FIG. 2A
FIG. 2B
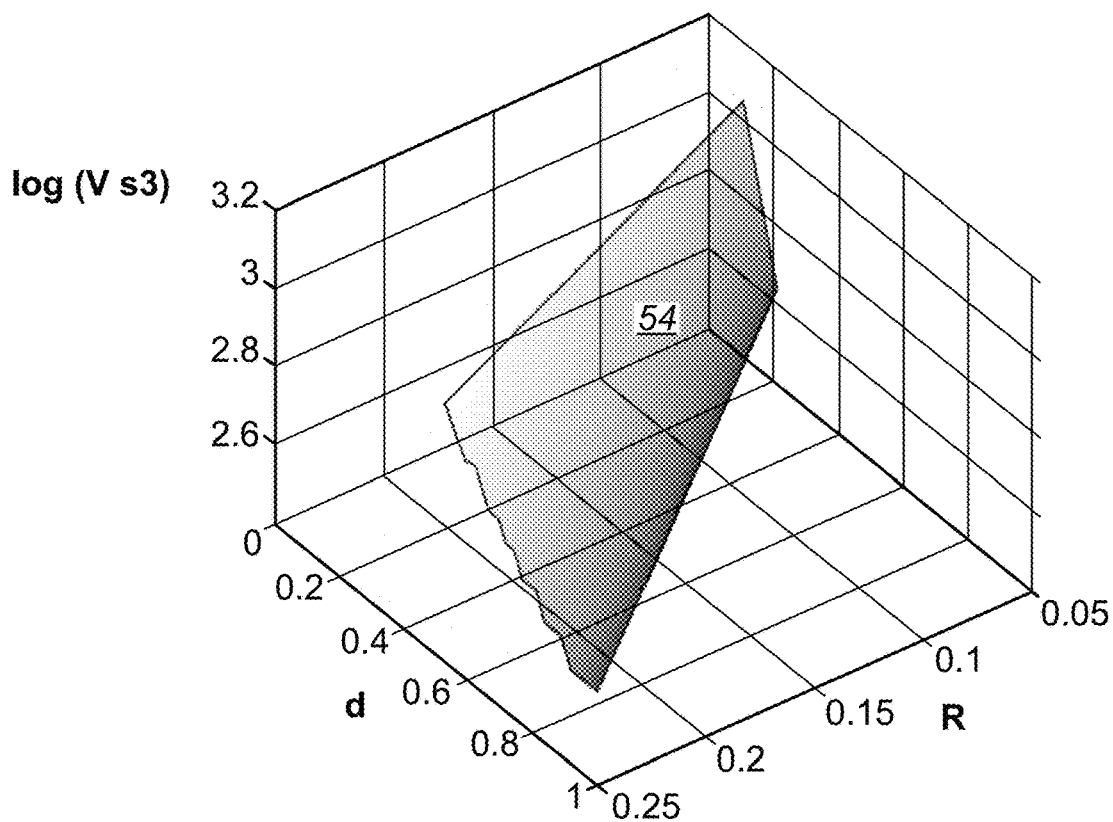

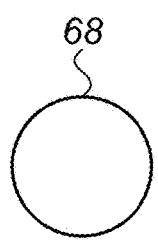
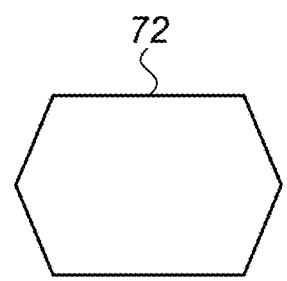
*FIG. 4A*  *FIG. 4B*  *FIG. 4C*
*FIG. 5*
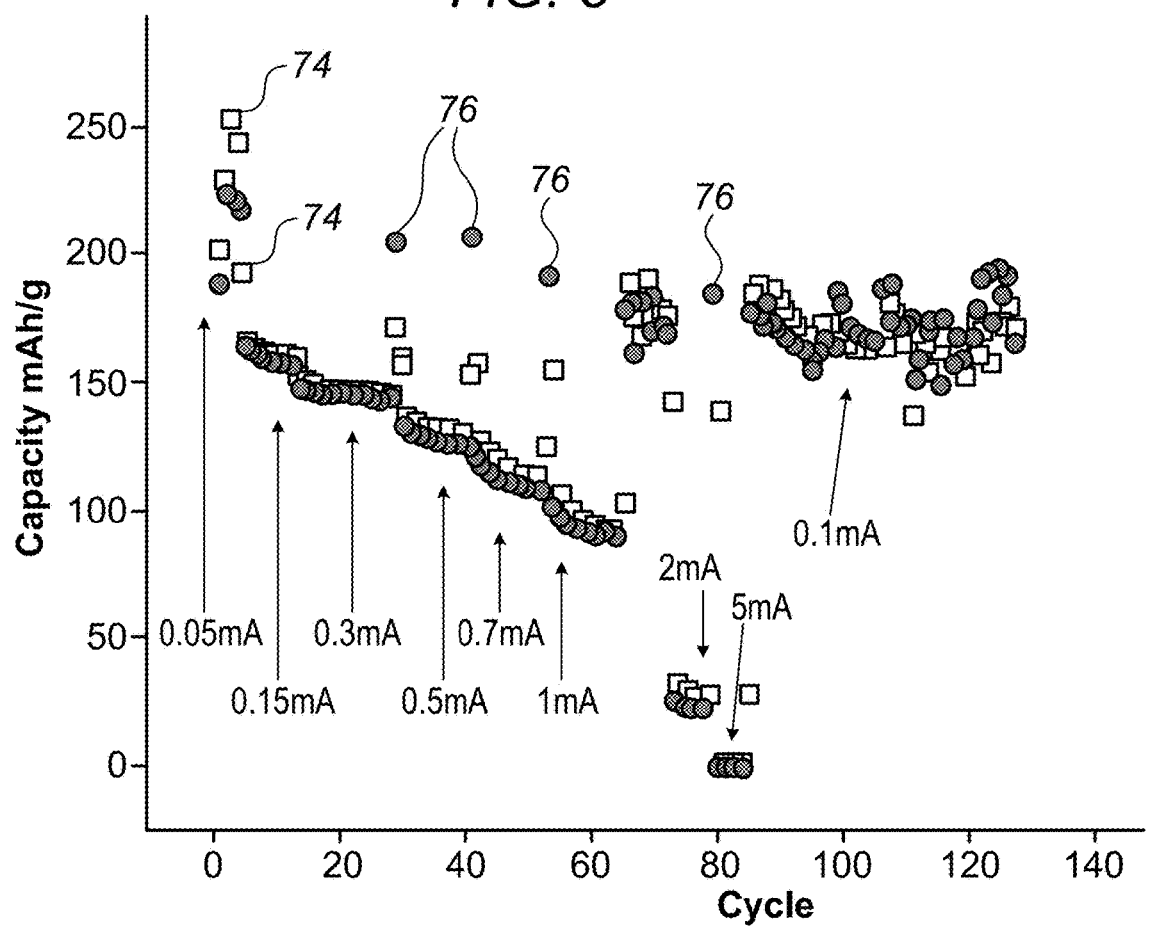

3D MICRO-BATTERY ON 3D-PRINTED SUBSTRATE

CROSS-REFERENCE TO RELATED APPLICATIONS

This application is a Continuation-In-Part (CIP) of PCT Application PCT/IB2016/055735, filed Sep. 26, 2016, which claims the benefit of U.S. Provisional Patent Application 62/234,689, filed Sep. 30, 2015. The disclosures of these related applications are incorporated herein by reference.

FIELD OF THE INVENTION

The present invention relates generally to electrical energy sources, and particularly to methods and systems for producing three-dimensional (3D) micro-batteries.

BACKGROUND OF THE INVENTION

Micro-batteries are used in various electronic devices, such as micro-sensors and wireless sensor networks, cognitive arthropods, and subdermal drug-delivery systems.

Various types of micro-batteries are known in the art. For example, U.S. Pat. No. 6,197,450, whose disclosure is incorporated herein by reference, describes thin-film micro-electrochemical energy storage cells (MEESC), such as micro-batteries and double-layer capacitors (DLC). The MEESC comprises two thin layer electrodes, an intermediate thin layer of a solid electrolyte and optionally, a fourth thin current collector layer; said layers being deposited in sequence on a surface of a substrate. The MEESC is characterized in that the substrate is provided with a plurality of through cavities of arbitrary shape, with high aspect ratio. By using the substrate volume, an increase in the total electrode area per volume is accomplished.

SUMMARY OF THE INVENTION

An embodiment of the present invention that is described herein provides an electrical energy storage device including a substrate, an anode layer, a cathode layer, and a separator layer between the anode layer and the cathode layer. The substrate has multiple sets of intersecting cavities passing through the substrate in different directions. The anode layer, cathode layer, and separator layer are formed over a surface of the substrate within the cavities.

In some embodiments, the energy storage device further includes one or more current collector layers. In other embodiments, at least one of the current collector layers extends onto an external surface of the substrate. In yet other embodiments, a cross-section of a given cavity is circular or polygonal.

In an embodiment, internal surfaces of the cavities are roughened so as to increase a surface area of the cavities. In another embodiment, the cavities are arranged in multiple arrays of the cavities, the cavities in each array connect a respective pair of opposite faces of the substrate, and two or more of the arrays intersect one another. In yet another embodiment, the cavities in each array are parallel to one another.

In some embodiments, the cavities in each array are arranged in a regular polygonal grid. In other embodiments, the separator layer includes a polymer with impregnated liquid electrolyte. In yet other embodiments, the separator layer includes a solid electrolyte, which is configured to conduct ions between the anode layer and the cathode layer.

There is additionally provided, in accordance with an embodiment of the present invention, a method for producing an electrical energy storage device. The method includes producing a substrate, having multiple sets of intersecting cavities passing through the substrate in different directions. An anode layer, a cathode layer, and a separator layer between the anode layer and the cathode layer, are formed over a surface of the substrate within the cavities. In some embodiments, producing the substrate includes fabricating the substrate using three-dimensional (3D) printing.

In an embodiment, forming the anode layer and the cathode layer include simultaneously depositing oppositely-charged particles of an active anode material and an active cathode material, respectively. In an embodiment, the anode layer, the cathode layer and the separator layer are fabricated in a single concurrent 3D printing session.

There is additionally provided, in accordance with an embodiment of the present invention, a method for producing an electrical energy storage device. The method includes producing a substrate, having one or more protrusions extending from the substrate in one or more directions. An anode layer, a cathode layer, and a separator layer between the anode layer and the cathode layer, are formed over a surface of the substrate. In some embodiments, the substrate has a ratio of surface area to footprint area greater than two.

In an embodiment, the anode layer, the cathode layer and the separator layer are fabricated in a single concurrent 3D printing session.

The present invention will be more fully understood from the following detailed description of the embodiments thereof, taken together with the drawings in which:

BRIEF DESCRIPTION OF THE DRAWINGS

FIG. 2A is a graph showing the total surface area of a 3DMB as a function of the radius of cavities and the distance between the centers of the cavities, in accordance with an embodiment of the present invention;

FIG. 2B is a graph showing the volume of a 3DMB as a function of the radius of cavities and the distance between the centers of the cavities, in accordance with an embodiment of the present invention;

FIGS. 4A-4C are schematic, pictorial illustrations of 3DMB cavity cross-sections, in accordance with other embodiments of the present invention;

FIG. 5 is a graph showing a comparison between reversible capacities of a 3DMB carried out at different charging and discharging currents, in accordance with an embodiment of the present invention;

DETAILED DESCRIPTION OF EMBODIMENTS

Overview

Figure 1:
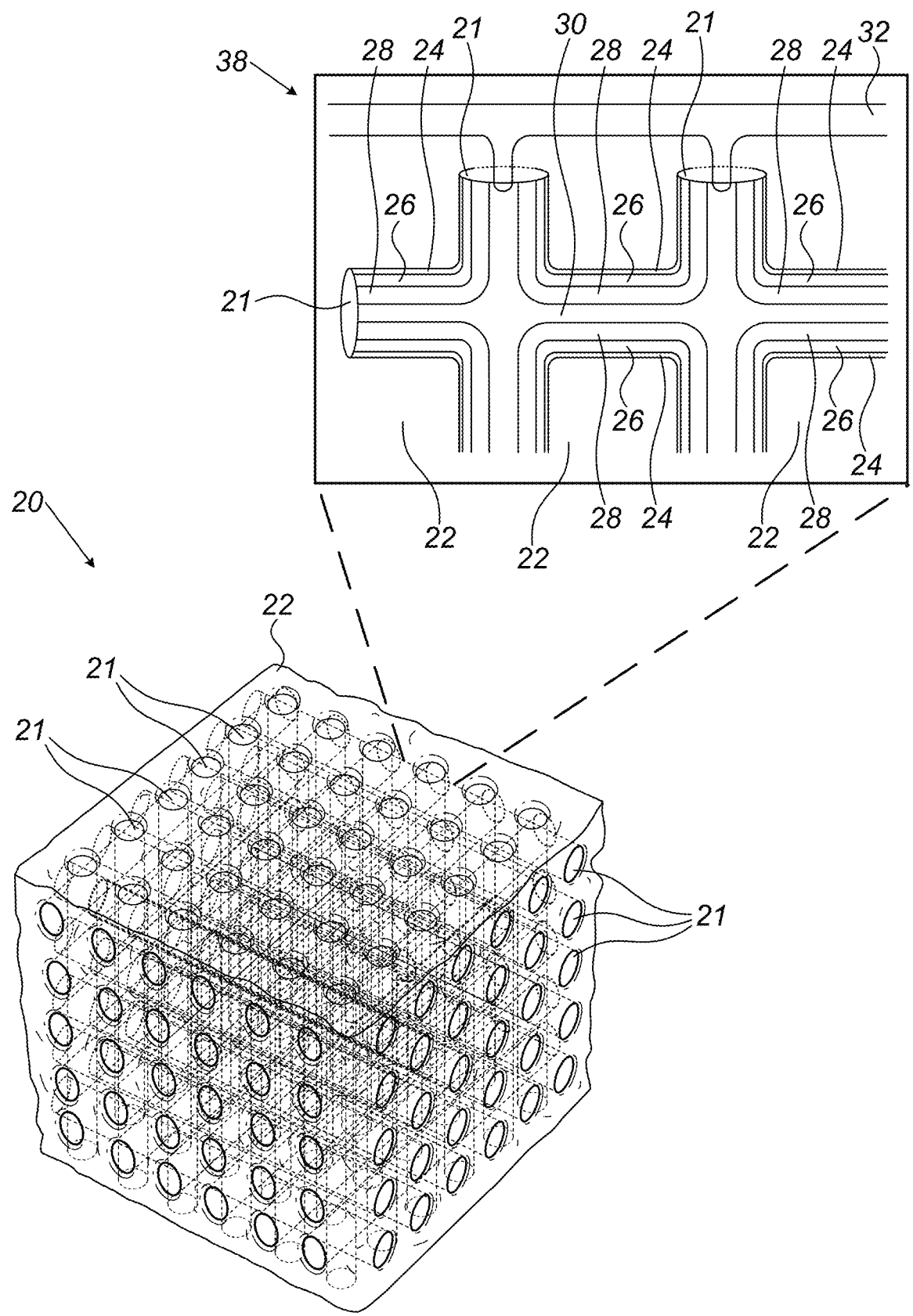
FIG. 1 is a schematic, pictorial illustration of a three-dimensional micro-battery (3DMB), in accordance with an embodiment of the present invention.

Rechargeable micro-batteries are used in various applications, such as micro-sensors, cognitive arthropods, and subdermal drug-delivery systems. The size of such batteries is typically on the order of a few millimeters, and they typically produce a steady-state power of a few microwatts with power peaks up to tens of milliwatts. Batteries are often characterized in terms of energy and power, which typically cannot be optimized simultaneously. The high-power capability of thin-film batteries is typically achieved by a short ion-diffusion path.

The main drawback of planar thin-film cells is that they produce low current and have low capacity. The capacity is directly proportional to the area and thickness of the electroactive layers used. Increasing the thickness does not always result in increased capacity and current, but typically increases the current path length, thereby causing a reduction in power density. However, the larger the ratio between the electrodes surface area and the electrode volume, the greater the energy storage capacity of the micro-battery per unit size.

A three-dimensional (3D) design can fold the complete thin-film cell structure from a planar geometry into a network occupying a small footprint, so that the overall current path remains short. For example, a glass or silicone bulk may be perforated with holes or cavities, so as to increase the effective surface area used for power generation in the battery. The gained area depends on the number of holes and on the aspect ratio (height/diameter) of these holes. A perforated silicon substrate containing an array of through-holes may be prepared, for example, using photolithography and double-sided deep reactive-ion etching (DRIE) techniques. Such techniques, however, are expensive and are typically limited to a substrate thickness on the order of 0.5 mm due to technical limitations such as mismatching of the mask for double-side DRIE, undercut edges, overheating and undesired surface roughness.

Embodiments of the present invention that are described hereinbelow provide improved 3D micro-battery (3DMB) configurations and associated techniques for producing these batteries, e.g., using 3D printing. The disclosed 3DMB configurations have improved electrical performance (e.g., energy, capacity) at a wide range of shapes that may be customized to fit various requirements of electronic devices. In some embodiments, the battery may be formed on a high-surface-area continuous complex-geometries 3D substrate. In another embodiment, the battery may be formed on a 3D substrate having multiple sets of intersecting cavities passing through the substrate in different directions, thereby increasing the surface area of battery electrodes.

In an embodiment, the 3D printing techniques allow controlling the size, shape, number and arrangement of the cavities formed in the substrate, thereby enabling a substantial increase of the area/volume ratio compared to other substrates known in the art, in which the cavities are all parallel and run in only one direction. In another embodiment, the disclosed substrate designs are also easier to coat with electrodes and an ion-conducting membrane, such as electrolyte, using various techniques, such as 3D printing, electrophoretic deposition, electroless deposition, electrochemical synthesis, electopainting, spray pyrolysis, or electrospinning. The disclosed techniques enable fabrication of various types of micro-batteries, such as all-solid-state 3DMBs having concentric layers of electrodes and solid electrolyte formed within the cavities.

In some embodiments, an entire 3D micro-battery (3DMB), including the substrate, anode layer, cathode layer, separator layer, as well as anode and cathode current collectors, is fabricated using 3D printing. In an embodiment, the entire 3DMB is fabricated in a single concurrent 3D printing session or process.

By using 3D printing techniques, the substrate may be produced from a wide variety of materials, such as polymers, metals and ceramics. Furthermore, 3D printing is not limited to a rectangular shape, so that the shape of the micro-battery may be customized to fit the space designated for the battery in the device to be powered.

The disclosed techniques enable producing micro-batteries and battery cells with improved performance mainly due to improved area/volume ratio. The disclosed batteries are low cost and can be designed with large variety of materials and shapes.

System Description

FIG. 1 is a schematic, pictorial illustration of a three-dimensional micro-battery (3DMB) 20, in accordance with an embodiment of the present invention. The embodiments described herein refer mainly to a single battery cell. Multiple such cells may be connected in series and/or parallel so as to produce a battery having higher capacity, power and/or voltage.

In some embodiments, battery 20 comprises a cubical substrate 22 having a typical size of a few millimeters per dimension or any other suitable size. Substrate 22 may be continuous or perforated, having multiple arrays of cavities 21 passing through substrate 22 in different directions. The arrays of cavities intersect one another so as to further increase the total surface area of battery 20. In some embodiments, cavities 21 may intersect orthogonally, or may be inclined relative to one another at any desirable angle.

In some embodiments, the cavities in each array may be arranged in a Cartesian coordinate grid, in which four neighboring cavities 21 create a square. In alternative embodiments, cavities 21 may be arranged in any suitable configuration, such as a honeycomb array (in which the centers of the cavities create a hexagon), a triangular array (in which centers of the cavities create a triangle), or a cylindrical array. Such configurations may be preferred for providing dense packaging (triangular) or mechanical strength (honeycomb), for example.

In some embodiments, substrate 22 may be produced using three dimensional (3D) printing techniques and may be made of polymer materials. The 3D printers may apply stereolithography (SLA) techniques, in which a movable stage that carries the 3DMB is accurately positioned and moved using precise actuators, such as those made by Thor Laboratories. In alternative embodiments, low-cost, off-the-shelf 3D printers may be adapted for the selected materials and specifications, as will be described below.

In some embodiments, substrate 22 is made from a rigid opaque polymer, such as Vero, produced by Stratasys.

The materials used in the 3D printing process, as well as the 3D printing technologies and the operating conditions of the printing process may determine the mechanical strength and the surface roughness of cavities 21 (whereas rough surface may further increase the area/volume ratio). For example, fused filament fabrication (FFF) printing techniques may be used for printing substrate 22 using polylactide (PLA), or other polymers, using plastic to print (PP) techniques. Other polymers, such as acrylonitrile butadiene styrene (ABS), Polyethylene terephthalate (PET), polydimethylsiloxane (PDMS), polyamide (Nylon), polyethylene (PE), polypropylene (PP), poly (methyl methacrylate) (PMMA), polystyrene (PS), polytetrafluorethylene (PTFE), polyvinylchloride (PVC), polyurethane (PU), polycarbonate (PC), and/or polyethylene oxide (PEO) and/or their mixtures may be used in FFF techniques.

High-grade 3D printers, such as Objet J750 by Stratasys, Inc. (Eden Prairie, Minn.), may process engineered materials such as polycarbonate, polyamide and polyphenyl sulfone (PPSF or PPSU), and polyethylene terephthalate (PET). It is important that the selected polymers are compatible with organic solvents, acids and/or bases that are typically used in the process. In addition, the polymers are desirably made thermally stable at temperatures of 100° C. and above, and chemically stable in the organic solvents used for the deposition of cathode layer depicted in an inset 38. Chemical stability may be of lesser importance when the surface of substrate 22 is fully coated with nickel or another suitable metal of 0.5-2 micron thickness, which serves as an electrical current collector.

In alternative embodiments, substrate 22 may be fabricated from other suitable materials such as metal or ceramic materials. Typical metals used for 3D printing include, for example, steel, aluminum, titanium, copper and precious metals such as gold and silver. The metals are typically heated using a laser and printed layer by layer using Selective laser sintering 3D printing techniques.

Ceramic 3D substrates may be printed using droplets of liquid binder on top of a thin layer of ceramic powder, followed by applying another layer of ceramic powder, then, a series of heat treatments are applied to dry, fire, and glaze the printed substrate. Glass 3D substrates may also be 3D-printed using powder bed fusion techniques.

In an embodiment, cavities 21 have a round cross-section, but may have any other suitable cross-section, such as triangular or hexagonal shape, so as to improve the mechanical strength of the substrate, and therefore of battery 20. In an embodiment, each cavity 21 may have a diameter of 50-100 micron or any other suitable diameter. The ratio between the length and the diameter of cavity 21 is referred to herein as an "aspect ratio." An aspect ratio that is considered as a high aspect ratio (HAR), is substantially larger than 12. For example, in a cubical substrate that is 10 millimeter long and has a diameter of 50 micron, the aspect ratio of each cavity 21 is 10,000/50=200.

The printing process may be carried out using various printing techniques, and using various configurations of cavities 21. For example, the printing process may be carried out using FFF techniques using, for example, an Up-Plus 2 printer produced by UP3D. The PLA may be deposited at a temperature of 220° C. and annealed so that it may withstand 80-90° C. without being deformed. Substrate 20 may have a cubical shape having a volume of 10×10×10 mm$^3$. In some embodiments, cavities 21 may be arranged in three intersecting arrays, such as arrays of 6-by-6 cavities per array, in which the cavities have a diameter of 1 mm. Each array of 6-by-6 cavities 21 may pass through substrate 22 between two parallel facets of the cubical substrate.

In other embodiments, for a cubical shape having a volume of 10×10×10 mm$^3$, the diameter of cavities 21 may be reduced to 100 micron or 50 micron according to the capabilities of the 3D printer. For example, each cavity 21 may have a diameter of 100 micron with a typical spacing of 100 micron between the cavities, in which case the number of cavities per array will be 50-by-50.

In alternative embodiments, the techniques and materials described above for producing substrate 20 may be used to produce substrates having non-cubical shapes, such as spherical and cylindrical shaped substrates as depicted, respectively, in FIGS. 3C and 3D below. In yet alternative embodiments, the substrate may be made of conductive polymer filled with graphene, printed by FFF techniques, using PLA-based filament made by Black Magic 3D. Example electrical performance of the graphene-based micro-batteries is depicted in performance graphs shown at FIGS. 6 and 7 below. Further alternatively, the 3D substrate may be made by subtractive manufacturing via one of the following techniques: laser micromachining, chemical or electrochemical etching or expanded metal process.

The use of 3D printing techniques allows customization of the 3DMB to accord with the available space within the device powered by the 3DMB. Several shapes of batteries that may be used in various applications are depicted in FIGS. 3A-3E. In an embodiment, a customized 3DMB may have a cylindrical shape with an oval-shaped upper surface so as to power a capsule endoscope. In another embodiment, a high-surface area fir-tree-shape continuous and perforated substrate may be printed so as to fit a pyramidal space in microelectronic devices.

The printing techniques and shapes disclosed above may also simplify coating processes of electrodes and an ion-conducting membrane 28, such as an electrolyte, on substrate 22 during the production of battery 20. For example, substrate 22 may allow using electrophoretic deposition techniques to deposit certain materials on HAR cavities so as to produce various types of all-solid-state micro-batteries having concentric layers of electrodes, and membrane 28 may comprise a solid electrolyte formed within each cavity. The electrolyte material may be in a solid form, a liquid form, or a hybrid of solid and liquid forms (e.g., HPE). In some embodiments, membrane 28 is deposited by inserting the polymer structures, coated by current collectors and by the electrode materials, into a slurry that comprises the electrolyte, or using any other suitable deposition technique.

In some embodiments, ion conducting membrane 28 is made of polymer or ceramics, or polymer-ceramic composite with impregnated liquid electrolyte, solid polymer electrolyte, hybrid electrolyte, composite polymer ceramic, glassy or crystalline ceramic. Membrane 28 may be prepared using various techniques such as spinning, or casting, or electropainting, or electrophoretic deposition.

In other embodiments, the structure of substrate 22 may be rigid, partially-flexible, or flexible. Substrate 22 may be used for the fabrication of different types of batteries, such as zinc/air, aluminum/air, nickel-cadmium (NiCd), nickel-zinc (NiZn), nickel metal hydride (NiMH), and lithium-ion (Li-ion).

Reference is now made to inset 38 in FIG. 1. The inset shows an enlarged view of several intersecting cavities. As can be seen in the figure, intersecting cavities 21 are coated with electrodes (described below) and membrane 28 so as to form battery 20. Conformal battery layers vary by thickness and may finally completely fill the cavity. In an example process, substrate 22 is degreased using ethanol, and a layer of current collector 24 is deposited on substrate 22. A cathode layer 26 is deposited on current collector 24. Current collector 24 may be made of aluminum, nickel, gold, an alloy of nickel and cobalt, an alloy of nickel, cobalt and iron, or any other suitable material compatible with substrate 22 and with cathode 26.

In an embodiment an anode layer 30 can be deposited on a current collector 32, such as copper, nickel, gold or any other suitable material compatible with substrate 22 and with anode. In an embodiment, the deposition of nickel current collector 24 on substrate 22 is carried out using electroless deposition techniques. In some embodiments, cathode 26 is made from LiFePO$_4$ and a membrane of LiAlO$_2$-polyethylene oxide (PEO) and formed by electrophoretic deposition. Cathode 26 may alternatively comprise a wide range of materials, such as lithium manganese oxide, lithium cobalt oxide, lithium nickel oxide, silicates, copper sulfide, lithium sulfide, chalcopyrites, and sulfure. The selection of a specific material for cathode 26 is determined by the electrical specifications of battery 20.

In alternative embodiments, substrate 22 may be conductive to serve as a current collector, in which case current collector 24 may be omitted. In this embodiment, cathode 26 may be deposited directly on substrate 22. For example, substrate 22 is made from ABS polymer mixed with carbon fibers, such as, TW-CON175BK produced by Torwell Technologies Co., or conductive graphene Black Magic PLA-based filament.

The materials from which the electrodes (e.g., cathode 26 and anode 30) and electrolyte 28 are made can be deposited using various techniques, such as electrodeposition, electrophoretic deposition and electropainting materials. Various kinds of materials may be used, such as oxides, sulfides, oxysulfides, phosphates, silicates, carbon, graphite, carbon nanotubes, and graphene electron conductive additives, and binders.

In an embodiment, the cathode material may be formed by dispersing nanosized LiFePO$_4$ powder, black-pearl (BP) and C65 carbon additives in an acetone-based suspension containing 0.28 mg/L iodine at a ratio of LiFePO4:BP:C65 of 91:4:5, weighted percentage (wt. %), respectively. Lithium polyacrylate (LiPAA) is further used as a binder similarly to cathodes and anodes of lithium ion batteries.

In some embodiments, substrate 22 may be used as a working electrode and a graphite plate may be used as a counter electrode for the deposition process described above. In an embodiment, a constant voltage ranging between 10-250 volts may be applied between the two electrodes for a duration of 60-120 seconds, but any other suitable combination of voltage and duration may be used.

Using nanosize carbon-coated lithium ferrous phosphate (LFP) particles is known to enhance the electrical conductivity and ionic migration of Li+ in LFP. As described, however, by Mazor et al., in "Electrophoretic deposition of lithium iron phosphate cathode for thin-film 3D-microbatteries," *Journal of Power Sources, volume* 198, pages 264-272, 2012, which is incorporated herein by reference, adding supplementary carbon to the suspension is necessary to create a pathway for electrons between the LiFePO$_4$ particles in electrophoretically deposited cathode 26 and also between these particles and current collector 24.

In some embodiments, other materials, such as black-pearl and C65 carbons, Poly methyl methacrylate (PMMA), polyvinylidene difluoride (PVDF), LiPAA, and Polyvinylpyrrolidinone (PVP) polymers may be used as additives to the suspension, so as to improve the electrical conductivity of LFP and the integrity of the composite cathode. The inventors have found that it is important to minimize the concentration of polymers so as to improve adhesion and not to isolate the particles active material.

Membrane 28 is adapted to conduct ions via intrinsic conduction pathways (e.g., a solid polymer), or via impregnated liquid (e.g., a liquid electrolyte). In some embodiments membrane 28 may be produced in other forms, such as a hybrid electrolyte, a composite of polymer and ceramic, a glass or a crystalline ceramic. Membrane 28 may be formed using various techniques, such as, electropolymerization, electrophoretic deposition, electropainting of pristine and composite materials, physical and chemical evaporation, spinning or casting techniques. For example, a membrane of hybrid polymer electrolyte (HPE) may be prepared by electrophoretic deposition and soaked by a liquid electrolyte.

Anode 30 may be formed using electrochemical synthesis, electrophoretic deposition (EPD) technique, physical and chemical evaporation, spinning or casting techniques and made from any suitable material, such as graphite, hard carbon, carbon nanotubes, graphene, spinel lithium titanium oxide, Li$_4$Ti$_5$O$_{12}$, titanium dioxide, TiO$_2$, silicon, germanium, tin and their alloys; silicon monoxide and tin oxide; conversion materials, such as oxides, phosphides, sulphides and nitrides (MxNy; M Fe, Co, Cu, Mn, Ni and N O, P, S and N).

In some embodiments, current collecting layer 32 may be deposited over anode 30. Layer 32 is configured to collect electrons from anode 30 during the operation of battery 20. Layer 32 is typically made of copper, gold, or any other suitable conductive material that is compatible with anode 30. Layer 32 may be deposited using electroless, sputtering or EPD techniques. When the micro-battery is assembled or packaged, current collectors 24 and 32 are connected to the two battery terminals.

In alternative embodiments, the electrical contact to anode 30 may be formed during the packaging of battery 20 so as to collect the electrons from the anode, in which case, the deposition of layer 32 may be omitted.

The materials used for depositing or printing the electrodes (e.g., cathode 26 and anode 30), and membrane 28, are not restricted for usage in Li-ion batteries, but may be also used in other types of batteries, such as Zn/air, alkali metal/air, lithium/sulfur, zinc/manganese oxide, nickel/cadmium. The electrodes and solid electrolyte may be deposited using various techniques, such as electroless, electrodeposition, electrophoretic deposition, vacuum spinning, electrospinning, and casting.

The inventors further assembled the Li/LiFePO$_4$ cell, comprising the cathode with LiPAA binder, using a typical lithium-ion battery electrolyte LiPF$_6$:EC:DEC. The cell was tested for over 100 reversible cycles and the test results are described in FIG. 5 below.

In other embodiments, cathode 26 may be coated with a PEO-in-LiAlO$_2$ membrane using EPD. The relative content of polyethylene oxide and LiAlO$_2$ in the membrane depends on the type of solvent and composition of the suspension. The ionic conductivity of a composite membrane, with impregnated 0.3 mole (M) LiTFSI-PYR14TFSI ionic-liquid electrolyte is 1-3 millisiemens (mS)/centimeter(cm) at 30-60° C. and comparable to that of commercial battery separators. The conductivity of quasi-solid plasticized-by-ionic-liquid (IL) PEO-in-LiAlO$_2$ electrolyte (1:1 PEO:IL ratio) is 0.2 mS/cm at room temperature, and this conductivity typically remains close to constant up to 100° C.

In yet another embodiment, substrate 22 may be coated by nickel current collector 24, followed by an LFP cathode 26 and a LiAlO$_2$-PMMA-based membrane. Battery 20 may further comprise membrane 28, which is made of LiPF$_6$:EC:DEC electrolyte. Anode 30 and layer 32 are deposited using materials and printing techniques as described above. In an alternative embodiment, cathode 26 may comprise an LFP cathode and a LiAlO$_2$-PEO-LiPAA-based membrane.

In other embodiments, cathode 26 may comprise an LFP cathode and a LiPAA-based membrane, and the electrolyte may be made of LiTFSI-PYR14TFSI ionic-liquid.

In yet other embodiments, cathode 26 may be deposited on collector 24 using electrosynthesis. The cathode materials typically comprise copper sulfide, molybdenum sulfide, iron oxysulfide, molybdenum oxysulfide and their combination. A vanadium oxide ($V_2O_5$) cathode can be electrosynthesized anodically or cathodically on the surface of the current collector. In other embodiment polymer membrane, Poly(ethylene-co-acrylic acid) (PEAA) (MW=17,200 g/mole, 20 wt. % acrylic acid (Aldrich) may be formed by electropainting from an alkaline bath (pH=12-13) containing 0.9% (v/v) PEAA lithium salt, 0.1 M lithium hydroxide and 1-5 part-per-million (ppm) sodium dodecyl sulfate. The deposition may be carried out by applying a constant potential of five volts for 20-60 seconds in a two-electrode bath at room temperature without agitation. The electrolyte may be made of LiTFSI-PYR14TFSI ionic-liquid or any other suitable electrolyte.

In alternative embodiments, membrane 28 may comprise sodium carboxymethylcellulose (NaCMC) (MW=250,000 g/mole, DS=1.2 (Aldrich), which is anodically electropainted from a neutral bath (pH=6-7). The bath solution used for electropainting may contain 1% (w/w) NaCMC. A constant potential of five volts may be applied for 30 minutes at room temperature without agitation. The resulting sample may be cured at 80° C. for one hour. The membrane can be used as solid electrolyte or as hybrid with impregnated ionic-liquid or any other non-aqueous Li-ion battery electrolyte.

In another embodiment, both cathode 26 and the polymer membrane may be formed using electrospinning techniques. The polymer membrane may comprise nanoparticles of lithium-ion conducting ceramics and any suitable polymer binder. The membrane may be used as solid electrolyte or as hybrid with impregnated ionic-liquid or any other Li-ion battery electrolyte.

In some embodiments, substrate 22 may be printed by FFF technology using conductive graphene PLA-based filament Black Magic 3D. Substrate 22 may be rectangular, cubical, or may have any other desirable shape. Such substrate, 22 typically conducts electrons, thus substrate 22 may be coated directly by an LFP or other cathode and may be further tested in a Li-ion cell as further depicted in FIGS. 6 and 7 below.

In alternative embodiments, the layers deposited on substrate 22 may be applied in the opposite order to that shown in FIG. 1. In such embodiments, the layering sequence begins with the deposition of current collector layer 32 on substrate 22, followed by sequential deposition of anode 30, membrane 28 or solid electrolyte, cathode 26 and current collector 24.

FIG. 2A is a 3D graph in which a surface 52 shows the total surface area of battery 20, depending on the radius (denoted R) of cavities 21 and the cavities inter-distance (denoted d), in accordance with an embodiment of the present invention.

The "area gain" achieved for substrate 22 or for any other substrate shown in this patent application (e.g., in FIGS. 4A, 4B, 4C, 4D, and 4E) is defined by the ratio between the total surface area of the substrate and the footprint of the substrate. The area gained by perforating substrate 22 with three-axial cavities 21 may be 1.5 to 10 times higher than the area gained using one-axial array of cavities. In other words, perforating all six facets of substrate 22 may obtain an area gain factor between 1.5 and 10 compared to perforating only two parallel facets of surface 22.

The expected area gain depends on parameters, such as the diameter of cavities 21, the distance between the centers of neighboring cavities, and the shape and total size of substrate 22.

The distribution of cavities 21 may be uniform across the substrate or may be non-uniform, so as to obtain desired geometrical ratio and electrical performance of battery 20, such as volume-to-footprint, and surface-to-volume.

For a given footprint area A, for example a square of 10×10 mm², the three-axial arrays of cavities 21 may increase the surface area of the battery. The surface area, $A_{s,1}$ of a battery having one-axial array of cavities, is provided by equation (1)

$$A_{s,1} = 2\pi N^3 R d \quad (1)$$

wherein N denotes the number of cavities in a row, R denotes the radius of the cavity and d denotes the distance between the centers of the cavities. Assuming a cubic battery having Nd×Nd×Nd dimensions, adding two similar arrays of cavities 21 in intersecting directions may increase the available surface area. The increase of the surface area may be less than threefold due to the three-cylinder Steinmetz solid's surface area that has to be reduced at the intersections of the arrays.

The total surface area ($A_{s,3}$) of a cubical battery having three-axial arrays of cavities 21 as shown in FIG. 1 is provided using equation (2):

$$A_{s,3} = 3A_{s,1} - 48(2-\sqrt{2})R^2 N^3 \quad (2)$$

For example, in a 10×10×10 mm³ battery using arrays of N×N=25×25 cavities with diameter of 2R=Ø=0.2 mm and distance between the cavities of d=0.4 mm, $A_{s,1}$=3927 mm² and $A_{s,3}$=7387 mm², representing an increase of 88% or a factor of 1.9 in the surface area of the battery. The smaller the diameter R and the inter-cavity space d, the larger the surface area gain of the battery using through interconnected perpendicular channels (INPC) (e.g., cavities 21) formed via XYZ planes as shown in FIG. 2A.

FIG. 2B is a 3D graph in which a surface 54 shows the volume gain in battery 20, depending on the radius (R) of cavities 21 and the distance (d) between the centers of the cavities, in accordance with an embodiment of the present invention.

As shown in FIG. 2B, the highest volume gain is obtained at a minimal distance between neighboring cavities 21, independently of the diameter of cavities 21. The choice of optimal perforation of substrate 22 may be based on the specifications of battery 20 to obtain the desired electrochemical performance, the possibility of insertion of conformal layers of active battery materials within the cavities, and on the mechanical integrity of the structure of battery 20.

Figure 3A:
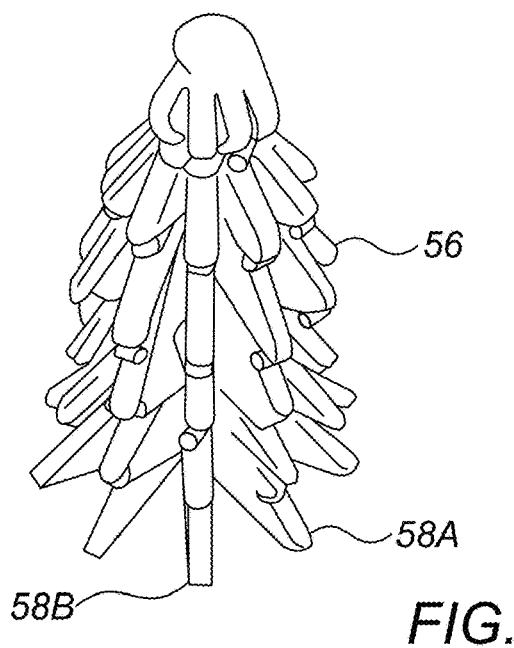
FIGS. 3A-3E are schematic, pictorial illustrations of alternative 3DMB configurations, in accordance with other embodiments of the present invention.

FIG. 3A is a schematic, pictorial illustration of a substrate 56 of a 3D micro-battery, in accordance with another embodiment of the present invention. In this embodiment, substrate 56 has a branched pyramidal shape printed by FFF techniques using graphene-filled PLA.

In this embodiment, substrate 56 is not perforated, but the branched pyramidal shape results in an area gain (i.e., total surface area divided by the footprint) greater than 2. The smaller the individual features of the branched pyramidal substrate, e.g., features 58A and 58B, the larger the surface area, and therefore also the resulting area gain. Since the graphene-filled PLA is conductive, substrate 56 may be coated directly by LFP cathode, LiAlO2-PEO-based membrane and Li4Ti5O12 anode, using EPD techniques.

The battery formed on substrate 56 may then be assembled in an appropriate compartment with impregnated 0.4 M LiTFSI-PYR14TFSI ionic liquid or typical lithium-ion battery electrolytes.

In an embodiment, binders, such as Lithium salt of polyacrylic acid (PAALi) and PVP may be used for electrophoretic deposition of composite $LiNi_{0.8}Co_{0.15}Al_{0.05}O2$ (NCA) cathode and $Li_4Ti_5O_{12}$ anode films.

The configuration of FIG. 3A depicts an example in which a substrate has or more protrusions that extend from the substrate in one or more directions, in order to achieve a high surface area and thus a large area gain. In alternative embodiments, other suitable substrate geometries having multiple protrusions can be used.

Figure 3B:
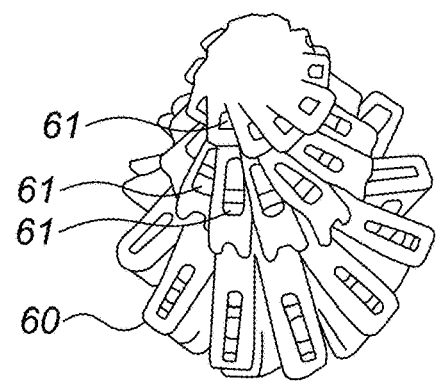

FIG. 3B is a schematic, pictorial illustration of a substrate 60 of a 3D micro-battery, in accordance with another embodiment of the present invention. In this embodiment, substrate 60 is perforated with cavities 61 that further increase the resulting area gain of the substrate. Substrate 60 may have a branched pyramidal shape (similar to the shape of substrate 56 of FIG. 3A above), or any other desirable shape that to fit the space designated for the battery in a device to be powered.

Figure 3C:
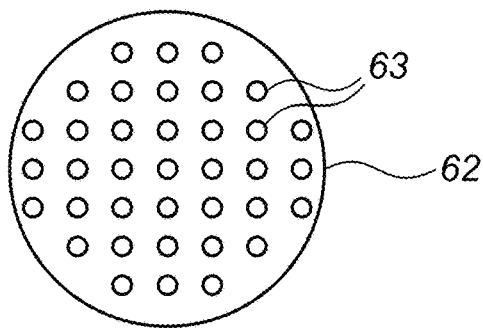
Figure 3D:
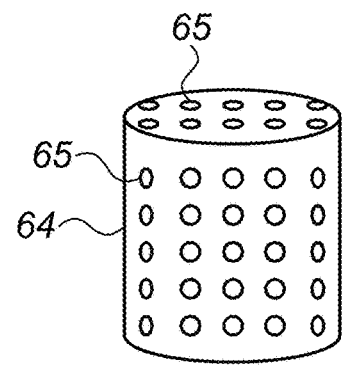
Figure 3E:
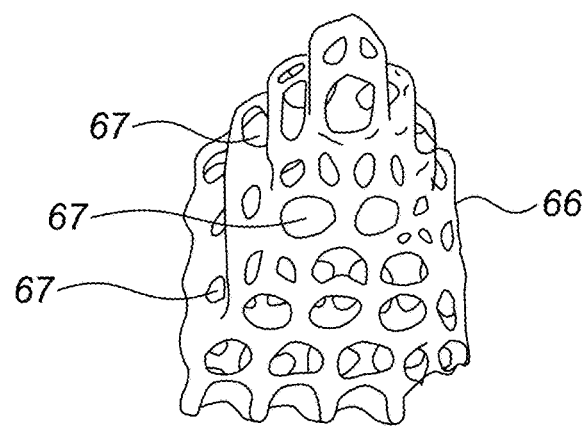

FIGS. 3C-3E are schematic, pictorial illustrations of alternative configurations of 3D micro-batteries, in accordance with other embodiments of the present invention. FIG. 3E shows an example of a pyramid-shaped substrate 66, perforated by cavities 67 so as to increase the area gain. FIG. 3C shows an example of a spherical substrate 62 perforated by cavities 63, and FIG. 3D shows an example of a cylindrical substrate 64 perforated by cavities 65.

FIGS. 4A-4C are schematic, pictorial illustrations of various possible cross-sections of the cavities formed in battery 20, in accordance with embodiments of the present invention. FIG. 4A shows a cavity having a circular cross-section 68, similar to the shape of cavities 21 depicted in FIG. 1. FIG. 4B shows a cavity 70 having a triangular cross-section, and FIG. 4C shows a cavity 72 having a hexagonal cross-section 72. As described in FIG. 1, the shape of the cavity, and of the grid of cavities 20 as a whole, may affect the performance of the battery, such as mechanical strength of the battery that may increase by using a cavity having cross section 72 rather than cross section 70.

FIG. 5 is a graph showing a comparison between reversible capacities of battery 20 carried out at different charging and discharging currents, in accordance with an embodiment of the present invention.

As described in detail in FIG. 1 above, in some embodiments battery 20 may be formed as a graphite(Gr)/$LiFePO_4$ cell, comprising the cathode with LiPAA binder assembled with a typical Li-ion battery electrolyte LiPF6:EC:DEC and graphite-based anode. This implementation of battery 20 was tested for over 100 reversible cycles, and the graph of FIG. 5 shows the charging capacity (represented by squares 74) and discharging capacity (represented by circles 76) achieved.

The inventors have conducted a battery test on a battery similar to battery 20 of FIG. 1. The test started with low charge/discharge currents, such as 0.05 milliamperes (mA), and continued by increasing the charging and discharging cycles to high currents, such as 1 mA. The results show that after more than 60 charging/discharging cycles, battery 20 can produce a current that is 20 time higher (e.g., 1 mA compared to 0.05 mA) but the corresponding capacity is reduced only by half (e.g., from about 200 mAh/g to about 100 mAh/g).

Furthermore, after being aggressively tested at high currents, such as 5 mA, battery 20 was further examined at currents of 0.1 mA for over 130 cycles in total. The results show high durability of battery 20 to maintain a capacity of 150-200 mAh/g as measured in 0.05 mA and 0.15 mA at the beginning of the test, when battery 20 was fresh (before cycling).

Figure 6:
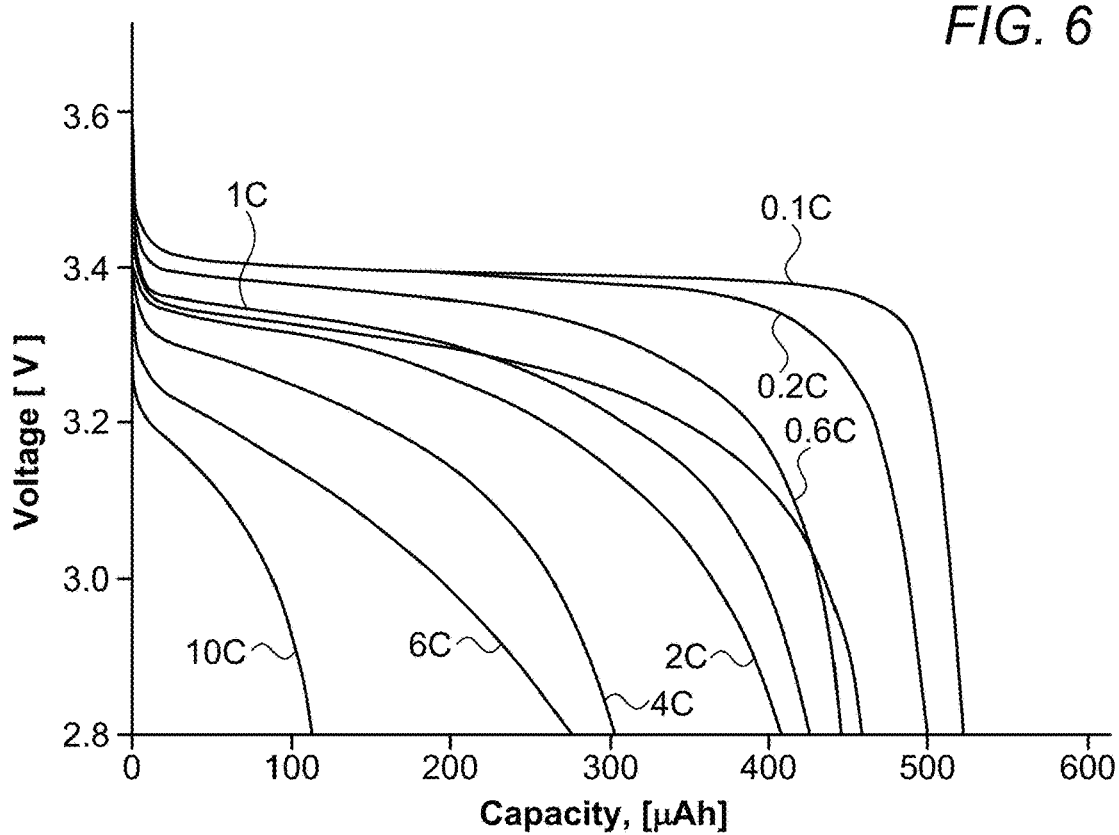
FIG. 6 is a graph showing a correlation between the capacity and voltage of a 3DMB at different discharging rates, in accordance with an embodiment of the present invention.

FIG. 6 is a graph showing a comparison between the reversible capacities and voltage between terminals of battery 20 at different discharging rates, in accordance with an embodiment of the present invention.

The term C-rate specifies the total capacity available when battery 20 is discharged at a certain discharge current from 100 percent state-of-charge to the cut-off voltage. Capacity is calculated by multiplying the discharge current (in Amps) by the discharge time (in hours) and decreases with increasing C-rate.

The discharge current of a battery is typically expressed as a C-rate so as to normalize against battery capacity, which may differ between batteries. A C-rate is a measure of the rate at which a battery is discharged relative to its maximum capacity. For example, a 1C rate means that the discharge current will discharge the battery to the cutoff voltage in one hour, whereas a 10C rate means discharging the battery to the cutoff voltage in 6 minutes.

The 3D-printed perforated substrates of rectangular and cubic shapes were prepared by FFF technology using conductive graphene PLA-based filament Black Magic 3D. Both shapes were coated directly by LFP cathode and tested in the Gr/LFP cell. Charge/discharge curves of the rectangular perforated substrate shown in FIG. 6 are typical curves. The voltage between the terminals of battery 20 at an idle state is 3.4 volts (V). At low discharge rates, such as 0.1C, battery 20 retains the level of 3.4V until the battery is completely discharged due to termination of the electrode materials as shown in the right side of the graph. At high discharge rates, such as 10C, the voltage between the terminals of battery 20 drops fast. The results show that battery 20 can retain a high operating voltage of about 3.2 V also at high discharge rates, such as 1C and 2C.

Figure 7:
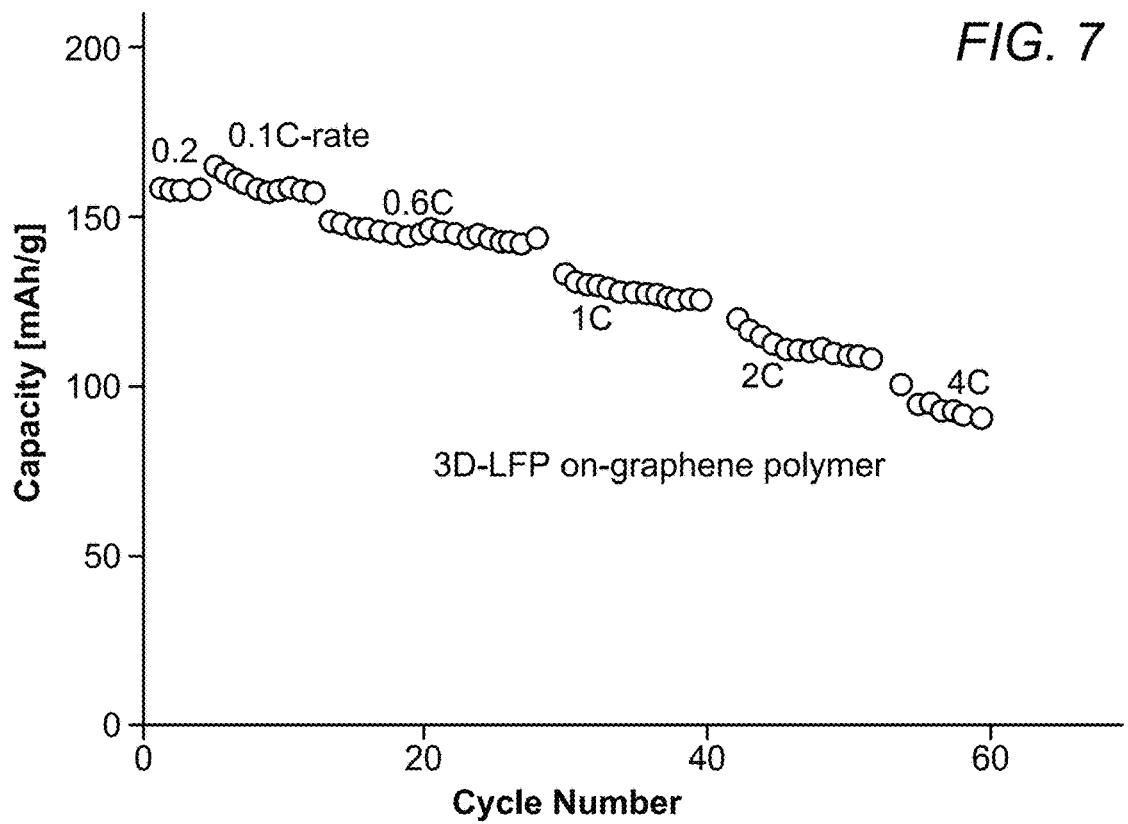
FIG. 7 is a graph showing a comparison between reversible capacities of a 3DMB carried out at different charging and discharging currents, in accordance with another embodiment of the present invention.

FIG. 7 is a graph showing a comparison between reversible capacities of battery 20 carried out at different charging and discharging currents, in accordance with an embodiment of the present invention.

The perforated substrate was prepared by FFF printing technology using conductive graphene PLA-based filament Black Magic 3D, coated directly by LFP cathode and tested in the Gr/LFP cell as described in FIG. 6 above.

Battery 20 was ran for 60 reversible cycles at different charge/discharge rates (i.e., currents), and the capacity of the battery was measured for every current value. For example, at low currents, such as 0.1C, the capacity was about 150 mAh/g (close to the theoretical value of the LFP cathode, whereas at currents that are 40 times higher, e.g., 4C, the capacity was lower by only 50 percent, to a level of 100 mAh/g. The results show that battery 20 can output very high currents while exhausting a relatively small fraction of the capacity.

The configurations micro-battery and battery cell described herein are example configurations that have been chosen purely for the sake of conceptual clarity. In alternative embodiments, any other suitable configuration, which is based on a substrate having multiple sets of intersecting cavities passing through the substrate in different directions, or having irregular shapes such as the branches depicted in FIG. 3A, can be used.

In some embodiments, the cathode layer and the anode layer are formed respectively around the positive and negative current collectors, by simultaneously depositing oppositely-charged particles of an active cathode material and an active anode material, respectively. In these embodiments, a single suspension comprises the two types of particles (particles of the active cathode material and particles of the oppositely-charged active anode material). The anode layer and the cathode layer are formed simultaneously by deposition from this suspension. Then, the separator or solid electrolyte can be deposited over one of the electrodes. Alternatively, the inter-electrode gap may be filled by vacuum spinning or dispensing.

Although the embodiments described herein mainly address micro-batteries and battery cells, the methods and systems described herein can also be used in other applications, such as in supercapacitors.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An electrical energy storage device, comprising:
a substrate, having (i) a first pair of faces, and one or more first cavities passing through the substrate and connecting between the faces of the first pair, and (ii) a second pair of faces, and one or more second cavities passing through the substrate and connecting between the faces of the second pair, wherein at least one of the first cavities intersects with at least one of the second cavities; and
a first electrode layer formed over a surface of the substrate within at least one of the first and second cavities, a separator layer formed over the first electrode layer and concentrically with the first electrode layer, and a second electrode layer formed over the separator layer and concentrically with the separator layer and the first electrode layer, wherein the first electrode layer, the separator layer and the second electrode layer are formed over one another so as to gradually progress away from the substrate and at least partially fill the at least one of the first and second cavities.

2. The device according to claim 1, and comprising one or more current collector layers.

3. The device according to claim 2, wherein at least one of the current collector layers extends onto an external surface of the substrate.

4. The device according to claim 1, wherein a cross-section of at least a given cavity among the first and second cavities is circular or polygonal.

5. The device according to claim 1, wherein the first cavities and the second cavities are arranged in respective arrays that intersect one another.

6. The device according to claim 5, wherein the first or second cavities in each array are parallel to one another.

7. The device according to claim 5, wherein the first or second cavities in each array are arranged in a regular polygonal grid.

8. The device according to claim 1, wherein the separator layer comprises a polymer with impregnated liquid electrolyte.

9. The device according to claim 1, wherein the separator layer comprises a solid electrolyte, which is configured to conduct ions between the first electrode layer and the second electrode layer.

10. A method for producing an electrical energy storage device, the method comprising:
producing a substrate, having (i) a first pair of faces, and one or more first cavities passing through the substrate and connecting between the faces of the first pair, and (ii) a second pair of faces, and one or more second cavities passing through the substrate and connecting between the faces of the second pair, wherein at least one of the first cavities intersects with at least one of the second cavities; and
forming over a surface of the substrate within at least one of the first and second cavities, a first electrode layer, a separator layer formed over the first electrode layer and concentrically with the first electrode layer, and a second electrode layer formed over the separator layer and concentrically with the separator layer and the first electrode layer, wherein forming the first electrode layer, the separator layer and the second electrode layer comprises gradually progressing away from the substrate and at least partially filling at least one of the first and second cavities.

11. The method according to claim 10, wherein producing the substrate comprises fabricating the substrate using three-dimensional (3D) printing.

12. The method according to claim 10, and comprising forming one or more current collector layers over the surface of the substrate.

13. The method according to claim 12, wherein forming the current collector layers comprises forming at least one of the current collector layers to extend onto an external surface of the substrate.

14. The method according to claim 10, wherein forming the first electrode layer and the second electrode layer comprise simultaneously depositing oppositely-charged particles of an active first electrode material and an active second electrode material, respectively.

15. The method according to claim 10, wherein producing the substrate comprises forming at least a given cavity among the first and second cavities with a circular or polygonal cross-section.

16. The method according to claim 10, wherein producing the substrate comprises forming the first cavities and the second cavities arranged in respective arrays that intersect one another.

17. The method according to claim 16, wherein forming the first cavities and the second cavities comprises forming the first or second cavities in each array parallel to one another.

18. The method according to claim 16, wherein producing the substrate comprises forming the first or second cavities in each array arranged in a regular polygonal grid.

19. The method according to claim 10, wherein forming the first electrode layer, the second electrode layer, and the separator layer comprises fabricating the first electrode layer, the second electrode layer, and the separator layer using three-dimensional (3D) printing.

20. The method according to claim 19, wherein the first electrode layer, the second electrode layer and the separator layer are fabricated in a single concurrent 3D printing session.

21. A method for producing an electrical energy storage device, the method comprising:
  producing a substrate, having one or more protrusions extending from the substrate in one or more directions; and
  forming over a surface of the substrate a first electrode layer, a separator layer formed over the first electrode layer and concentrically with the first electrode layer, and a second electrode layer formed over the separator layer and concentrically with the separator layer and the first electrode layer, wherein forming the first electrode layer, the separator layer and the second electrode layer comprises gradually progressing away from the substrate.

22. The method according to claim 21, wherein the substrate has a ratio of surface area to footprint area greater than two.

23. The method according to claim 21, wherein producing the substrate comprises fabricating the substrate using three-dimensional (3D) printing.

24. The method according to claim 21, wherein forming the first electrode layer, the second electrode layer, and the separator layer comprises fabricating the first electrode layer, the second electrode layer, and the separator layer using three-dimensional (3D) printing.

25. The method according to claim 24, wherein the first electrode layer, the second electrode layer and the separator layer are fabricated in a single concurrent 3D printing session.

* * * * *